(12) United States Patent
Park et al.

(10) Patent No.: US 9,723,402 B2
(45) Date of Patent: Aug. 1, 2017

(54) AUDIO DATA PROCESSING METHOD AND ELECTRONIC DEVICE SUPPORTING THE SAME

(71) Applicant: Samsung Electronics Co., Ltd., Gyeonggi-do (KR)

(72) Inventors: Seong Woong Park, Seoul (KR); Byung Jin Kang, Seoul (KR); Dae Yun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/838,193

(22) Filed: Aug. 27, 2015

(65) Prior Publication Data

US 2016/0066090 A1   Mar. 3, 2016

(30) Foreign Application Priority Data

Aug. 27, 2014 (KR) .................. 10-2014-0112651

(51) Int. Cl.
*H04R 3/00* (2006.01)
*H04R 1/40* (2006.01)
*H04R 25/00* (2006.01)
*G11B 27/28* (2006.01)
*G11B 27/034* (2006.01)
*H04R 1/32* (2006.01)

(52) U.S. Cl.
CPC ............ *H04R 3/005* (2013.01); *G11B 27/28* (2013.01); *H04R 1/406* (2013.01); *H04R 25/407* (2013.01); *G11B 27/034* (2013.01); *H04R 1/326* (2013.01); *H04R 2499/11* (2013.01); *H04S 2400/15* (2013.01)

(58) Field of Classification Search
CPC ...... G11B 27/28; G11B 27/034; H04R 3/005; H04R 1/326; H04R 2400/15; H04R 2499/11; H04R 1/406; H04R 25/407
See application file for complete search history.

(56) References Cited

U.S. PATENT DOCUMENTS

| | | | |
|---|---|---|---|
| 7,103,552 | B2 | 9/2006 | Cornwell |
| 2003/0223730 | A1 | 12/2003 | Cornwell |
| 2005/0182627 | A1 | 8/2005 | Tanaka et al. |
| 2013/0311186 | A1 | 11/2013 | Lee et al. |
| 2016/0173978 | A1* | 6/2016 | Li ........................ G10L 21/02 381/92 |

FOREIGN PATENT DOCUMENTS

| | | |
|---|---|---|
| EP | 2026329 | 2/2009 |
| EP | 2320677 | 5/2011 |

(Continued)

OTHER PUBLICATIONS

Extended European Search Report issued for EP 15182273.1 dated Dec. 4, 2015, 12 pgs.

*Primary Examiner* — Andrew L Sniezek

(57) ABSTRACT

An electronic device for processing audio data includes: a plurality of microphones configured to receive audio data which has at least one sound section where sounds of a specified frequency band exist within a specified time interval; and an audio data processing module configured to divide the received audio data by each direction of the sound source and collect at least one sound section from the divided audio data of each direction.

20 Claims, 12 Drawing Sheets

(56) References Cited

FOREIGN PATENT DOCUMENTS

| | | |
|---|---|---|
| EP | 2670165 | 12/2013 |
| JP | 2008197650 A | 8/2008 |
| JP | 2010074827 A | 4/2010 |
| KR | 20120011280 A | 2/2012 |
| WO | WO 2012/061151 | 5/2012 |

* cited by examiner

AUDIO DATA PROCESSING METHOD AND ELECTRONIC DEVICE SUPPORTING THE SAME

CROSS-REFERENCE TO RELATED APPLICATION AND CLAIM OF PRIORITY

The present application is related to and claims benefit under 35 U.S.C. §119(a) of a Korean patent application filed on Aug. 27, 2014 in the Korean Intellectual Property Office and assigned Serial number 10-2014-0112651, the entire disclosure of which is hereby incorporated by reference.

TECHNICAL FIELD

The present discloses to an audio data processing function.

BACKGROUND

In general, existing electronic devices support functions for recording and playing audio data.

The functions for recording and playing audio data collectively process audio data received from a plurality of sound sources disposed in different directions. In this case, electronic devices may have trouble with playing only audio data received from a sound source disposed in a specified direction. Additionally, a typical audio data processing function collectively processes a sound section and a mute section of the received audio data. Accordingly, a typical electronic device supporting this may not efficiently utilize a storage space and consumes time due to unnecessary data processing.

SUMMARY

To address the above-discussed deficiencies, it is a primary object of the present disclosure to provide a method of separately dividing and processing audio data received from a plurality of sound sources disposed in different directions and an electronic device supporting the same.

Embodiments of the present disclosure include an audio data processing method of storing and playing a sound section of audio data and an electronic device supporting the same.

Embodiments of the present disclosure include an electronic device for processing audio data. The electronic device includes: a plurality of microphones configured to receive audio data; and an audio data processing module configured to divide the received audio data by each direction and collect at least one sound section where sounds of a specified frequency band exist within a specified time interval from the divided audio data of the each direction.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
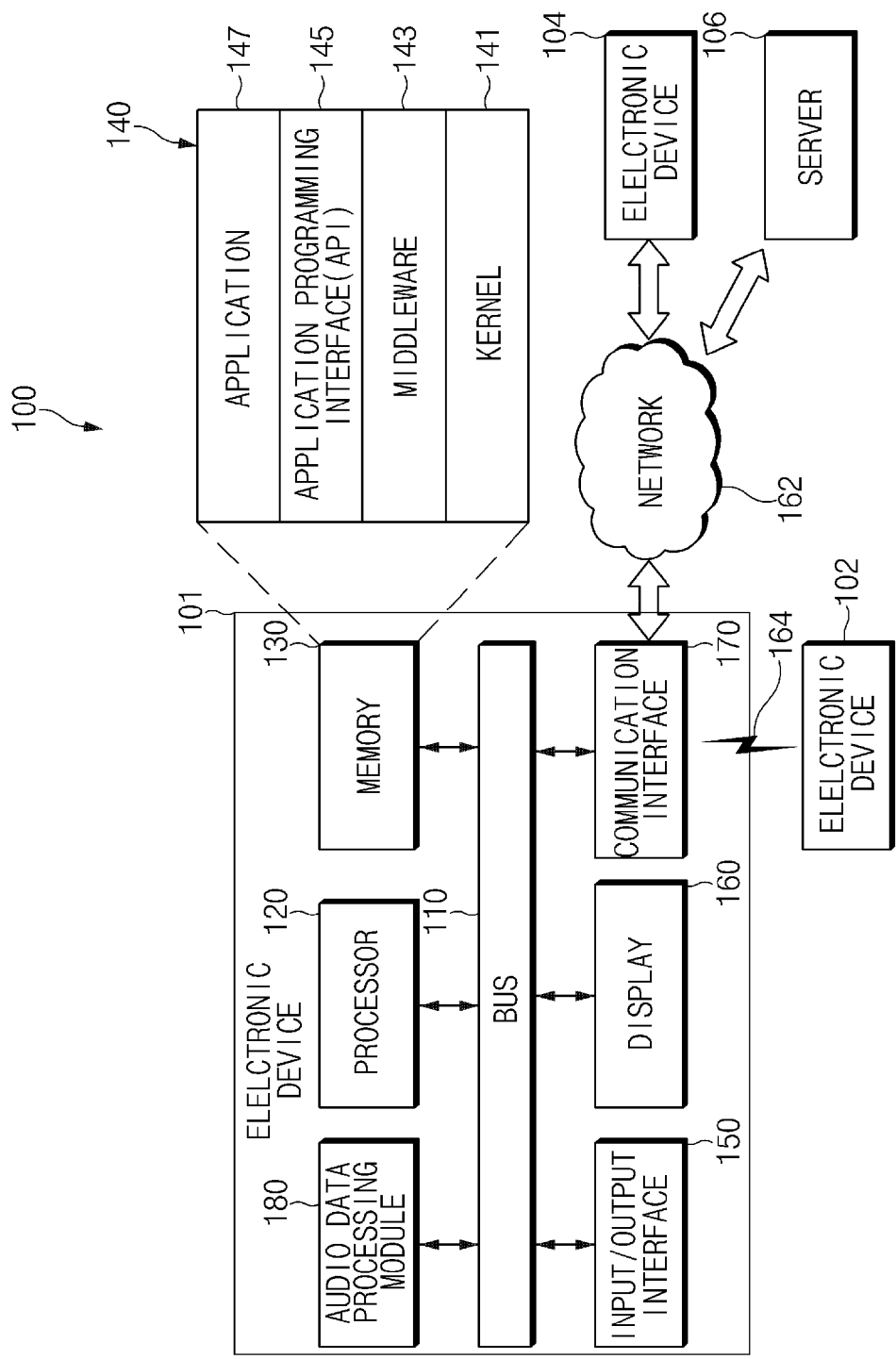
FIG. 1 illustrates an electronic device configuration and management environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In various embodiments of the present disclosure, it will be understood that when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (for example, smart glasses, head-mounted-devices (HMDs), electronic apparel, electronic bracelets, electronic necklaces, electronic accessories, electronic tattoos, smart mirrors, and smart watches).

An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 illustrates an electronic device configuration and management environment according to various embodiments of the present disclosure.

Referring to FIG. 1, an electronic device 100 in a network environment 100 is described according to various embodiments of the present disclosure. The electronic device 101 may include a bus 110, a processor 120, a memory 130, an input/output interface 150, a display 160, a communication interface 170, and an audio data processing module 180. According to an embodiment of the present disclosure, the electronic device 101 may omit at least one of the components or may additionally include a different component.

According to various embodiments, the electronic device 101 including the above-mentioned components may separately process audio data by each track, which is received from a plurality of sound sources disposed in different directions. The track, as a set of data where audio data is stored, may be a file in a predetermined format. For example, the track may include a header and a body. The body may include stored audio data. The header may include track information relating to audio data stored in the body.

The track information may include a recording time, a sound source direction range, or sound section information. The recording time may include a consumed recording time range and may include a display time of the electronic device 100 at the recording time. The sound source direction range may include a boundary direction value of a range specified based on a direction value of audio data. The direction value, as a value for measuring the direction of a target at a position spaced a predetermined distance from a specific point (for example, the center of a front display) of the electronic device 101, may be expressed with an orientation, an orientation angle, or a viewpoint. For example, in relation to the direction value, on the basis of the center of the front display in the electronic device 101, the top is represented with 0°N (or the 12 o'clock direction), the right is represented with 90°E (or the 3 o'clock direction), the bottom is represented with 180°S (or the 6 o'clock direction), and the left is represented with 270°W (or the nine o'clock direction). The sound section information may include the number of sound sections stored in a track, and the occurrence time and duration time of each sound section. The sound section may be an audio data set where sounds of a specified frequency band exist with a time interval.

The bus 110, for example, may include a circuit for connecting the above-mentioned components such as the bus 110 to the audio data processing module 180 to each other and delivering a communication (for example, a control message and/or data) between the components. According to various embodiments of the present disclosure, the bus 110 may deliver audio data received through the input/output interface 150 to at least one of the processor 120 and the audio data processing module 180.

According to various embodiments of the present disclosure, the bus 110 may deliver audio data processed in the audio data processing module 180 to the input/output interface 150 or the display 160. For example, the bus 110 may deliver a track including a sound section of audio data processed in the audio data processing module 180 to the memory 130.

The processor 120 may include at least one of a central processing unit (CPU), an Application Processor (AP), and a communication processor (CP). According to various embodiments of the present disclosure, the processor 120 may be prepared in a form of including the audio data processing module 180. Alternatively, the processor 120 may be prepared in a form of being separated from the audio data processing module 180 and may be prepared in a form of directly performing a communication through the bus 110 or directly. The processor 120, for example, may execute calculation or data processing for control and/or communication of at least one another component of the electronic device 101.

According to various embodiments of the present disclosure, the processor 120 may support data processing relating to the audio data processing module 180. The processor 120, for example, may execute calculation or data processing for control and/or communication of the memory 130 or the audio data processing module 180 in order to process audio data.

The memory 130 may include volatile and/or nonvolatile memory. The memory 130, for example, may store instructions or data relating to at least one another component of the electronic device 101. According to an embodiment of the present disclosure, the memory 130 may store software and/or program 140. The program 140 may include a kernel 141, a middleware 143, an application programming interface (API) 145, and/or an application program (or an application) 147. At least part of the kernel 141, the middleware 143, or the APT 145 may be called an operating system (OS).

According to various embodiments of the present disclosure, the memory 130 may store audio data. For example, the memory 130 may store a track including a sound section of audio data processed in the audio data processing module 180. Additionally, the memory 130 may store a track including audio data processed in the audio data processing module 180 by each sound source direction range.

The input/output interface 150, for example, may serve as an interface for delivering instructions or data inputted from a user or another external device to another component(s) of the electronic device 101. Additionally, the input/output interface 150 may output instructions or data received from another component(s) of the electronic device 101 to a user or another external device. According to various embodiments of the present disclosure, the input/output interface 150 may deliver instructions or data inputted from a user or an external device to at least one of the processor 120 and the audio data processing module 180.

According to various embodiments of the present disclosure, the input/output interface 150 may deliver audio data received through a plurality of microphones to at least one of the processor 120 and the audio data processing module 180. The plurality of microphones may be spaced a predetermined distance from each other in a predetermined area of the electronic device 101. According to various embodiments of the present disclosure, the input/output interface 150 may output entire or part of audio data processed in the audio data processing module 180.

The display 160, for example, may include a liquid crystal display (LCD), a light emitting diode (LED) display, an organic light emitting diode (OLED) display, a microelectromechanical systems (MEMS) display, or an electronic paper display. The display 160 may display various content (for example, text, image, video, icon, symbol, and so on) to a user. The display 160 may include a touch screen, and for example, may receive a touch, gesture, proximity, or hovering input by using an electronic pen or a user's body part.

According to various embodiments of the present disclosure, the display 160 may display track information. For example, the display 160 may display a recording time, a sound source direction range, or sound section information of audio data. The display 160 may display a boundary direction value of a sound source direction range with a line, an image, or a text. For example, when the boundary direction values are the 11 o'clock direction and the 1 o'clock direction, the display 160 may display a line indicating the 11 o'clock direction and the 1 o'clock direction on the basis of the center of the front display. Additionally, the display 160 may display the number of sound sections, and the occurrence time and duration time of each sound section.

The communication interface 170, for example, may perform a communication between the electronic device 101 and an external device (for example, the first external electronic device 102, the second external electronic device 104, or the server 106). For example, the communication interface 170 may communicate with an external device (for example, the second external electronic device 104 or the server 106) in connection to the network 162 through wireless communication or wired communication.

Each of the first and second external electronic devices 102 and 104 may be the same or different type of the electronic device 101. According to an embodiment of the present disclosure, the server 106 may include a group of one or more servers. According to various embodiments of the present disclosure, all or part of operations executed on the electronic device 101 may be executed on another one or more electronic devices (for example, the electronic device 102 or 104 or the server 106). According to an embodiment of the present disclosure, when the electronic device 101 performs a certain function or service automatically or by a request, the electronic device 101 may request at least part of a function relating thereto from another device (for example, the electronic device 102 or 104 or the server 106) instead of or in addition to executing the function or service by itself. The other electronic devices (for example, the electronic device 102 or 104 or the server 106) may execute the requested function or an additional function and may deliver an execution result to the electronic device 101. The electronic device 101 may provide the requested function or service by processing the received result as it is or additionally. For this, for example, cloud computing, distributed computing, or client-server computing technology may be used.

The audio data processing module 180 may perform a function for processing audio data according to instructions inputted from a user or an external device, or scheduled data, which are delivered from the input/output interface 150. For example, the audio data processing module 180 may receive an audio data recording related event, a play related event, an information setting event, or a sensor information value change event.

According to various embodiments of the present disclosure, the audio data processing module 180 may process audio data received through a plurality of microphones. The audio data processing module 180 may measure a direction value of audio data received through a plurality of microphones. For example, the audio data processing module 180 may measure a direction value by using an intensity difference or a reception time difference of the received audio data. The direction value of the audio data may be a value indicating a reception direction of a sound source spaced a predetermined distance from the electronic device 101. The audio data processing module 180 may set a sound source direction range on the basis of a direction value of audio data. The sound source direction range may include a reception allowance range direction value of audio data received from a sound source. The audio data processing module 180 may process audio data having a direction value included within a boundary direction value of a specific sound source direction range as one sound source direction data.

According to various embodiments of the present disclosure, the audio data processing module 180 may store audio data in the memory 130. The audio data processing module 180 may store entire audio data or audio data divided by each direction (for example, sound source direction data). Additionally, the audio data processing module 180 may store sound sections of audio data separately. In this case, the audio data processing module 180 may sequentially connect sound sections and store them. Additionally, the audio data processing module 180 may store audio data including tagging information according to a reception time. The tagging information may include at least one of sound/mute section identification information and a sound source direction range of audio data.

The sound/route section identification information, as information for distinguishing the sound section and mute section of audio data, may include the occurrence time and duration time of each sound section. The sound source direction range, as information for processing audio data of a specific direction as one sound source direction data, may include a boundary direction value indicating a range.

According to various embodiments of the present disclosure, the audio data processing module 180 may process audio data in order to output it through the input/output interface 150. For example, the audio data processing module 180 may process entire or part of audio data in order to output it through an output device such as a speaker or an earphone.

According to various embodiments of the present disclosure, the audio data processing module 180 may process track information to be displayed on the display 160. The audio data processing module 180 may perform processing to display track information included in the header of a track. For example, the display 160 may perform processing to display a recording time, a sound source direction range, or sound section information of audio data. According to various embodiments of the present disclosure, the audio data processing module 180 may be included in the processor 120 or may be provided as an additional separate module.

Figure 2:
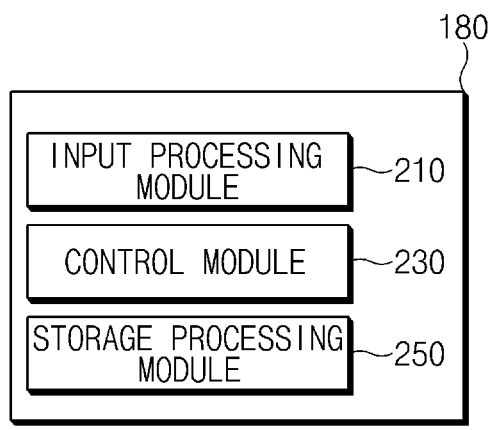
FIG. 2 illustrates an audio data processing module according to various embodiments of the present disclosure.

FIG. 2 illustrates an audio data processing module according to various embodiments of the present disclosure.

Referring to FIG. 2, an audio data processing module 180 according to various embodiments of the present disclosure may include an input processing module 210, a control/nodule 230, and a storage processing module 250.

The input processing module 210 may receive audio data or an input event relating to audio data. According to various embodiments of the present disclosure, the input processing module 210 may receive a recording related event, a play related event, an information setting event, or a sensor information value change event of audio data. The recording related event of the audio data may include a recording start request, a recording pause request, a recording cancel request, or a recording termination request. The play related event of the audio data may include a play start request, a play pause request, or a play termination request. Additionally, the information setting event of the audio data may include an information screen display request, a track name setting request, or an audio volume level setting request of audio data. According to various embodiments of the present disclosure, the input processing module 210 may receive audio data through a plurality of microphones.

The control module 230 may execute operations or data processing for a control and/or communication of components of the audio data processing module 180. According to various embodiments of the present disclosure, the control module 230 may process an input event for audio data.

The control module 230 may perform tasks such as activating a plurality of microphones, generating a recording buffer, or starting counting a recording time in correspondence to the recording start request of the audio data. The control module 230 may perform a control to store received audio data in a generated recording buffer. The control module 230 may perform a control to store audio data including tagging information according to a reception time, in a recording buffer. The tagging information may include at least one of sound/mute section identification information and a sound source direction range of audio data. According to various embodiments of the present disclosure, the control module 230 may deliver the recording buffer to the storage processing module 240 to store therein. The control module 230 may perform tasks such as deactivating a plurality of microphones, deleting a recording buffer, or ending counting a recording time in correspondence to the recording termination request of the audio data.

The control module 230 may perform tasks such as activating an output device such as a speaker, generating an output buffer, moving an output buffer of selected audio data, or starting counting a play time in correspondence to the play start request of the audio data. The control module 230 may perform tasks such as deactivating an output device, deleting an output buffer, or ending counting a play time in correspondence to the play termination request of the audio data.

The control module 230 may configure a screen including the name of a track where audio data is stored and track information to display them through the display 160 in correspondence to the information screen display request of the audio data. The track information may include a recording time, a sound source direction range, or sound section information.

According to various embodiments of the present disclosure, the control module 230 may perform a control to configure a recording related function object, a play related function object, or an information setting function object in a screen and display the screen. The recording related function object may include an object such as an image, icon, or button indicating a recording function of audio data. For example, the recording related function object may include a recording start button, a recording pause button, a recording cancel button, or a recording termination button. The play related function object may include an object such as an image, icon, or button indicating a play function of audio data. For example, the play related function object may include a play start button, a play pause button, or a play termination button. The information setting function object, as an object indicating an information setting function of audio data, may include a text field including a track name, or an audio volume level setting button.

The control module 230 may perform a control to position a cursor in a text box object including a track name in correspondence to a track name setting request and display a text input tool (for example, a keypad) in a predetermined area of a screen. The control module 230 may perform a control to display an object (for example, an image, a pop-up, and so on) indicating a section of an audio volume level and a current audio volume level in correspondence to an audio volume level setting request.

The control module 230 may perform a sound source direction correction task in correspondence to a sensor information value change event reception. For example, the control module 230 may correct a boundary direction value of a predetermined sound source direction range by using a change angle value measured through an acceleration sensor, a gyro sensor, a geomagnetic sensor, or an earth magnetic sensor.

According to various embodiments of the present disclosure, the control module 230 may process received audio data through the input processing module 210. The control module 230 may measure a direction value by using an intensity difference or a reception time difference of the received audio data. The control module 230 may set a sound source direction range on the basis of the direction value.

According to various embodiments of the present disclosure, the control module 230 may control an output of audio data. The control module 230 may perform a control to output entire or part of audio data in order to output the audio data through an output device such as a speaker or an earphone.

The storage processing module 250 may perform a function for storing audio data. According to various embodiments of the present disclosure, the storage processing module 250 may process a recording buffer received from the control module 230 and store it in a track. For example, the storage processing module 250 may extract tagging information from audio data stored in a recording buffer. The tagging information may include at least one of sound/mute section identification information and a sound source direction range. The storage processing module 250 may generate a track by each sound source direction range on the basis of the extracted tagging information. The storage processing module 250 may separately divide audio data corresponding to the generated track and process it to be stored therein. Additionally, the storage processing module 250 may perform processing to store only a sound section in a corresponding track on the basis of the extracted tagging information. In this case, the storage processing module 250 may perform processing to sequentially connect sound sections and store it.

Additionally, the storage processing module 250 may perform processing to store tracks stored by each sound source direction range in one integrated track. In this case, the storage processing module 250 may store track item information including the names of tracks stored in an integrated track.

Additionally, for example, the storage processing module 250 may perform processing to store track information in a corresponding track on the basis of the tagging information. The storage processing/nodule 250 may perform processing to store a recording time and sound section information on the basis of an occurrence time and a duration time of a sound section. Additionally, the storage processing module 250 may perform processing to store a sound source direction range. Additionally, the storage processing module 250 may perform processing to additionally or alternatively store the name of an integrated track relating to the track.

Figure 3:
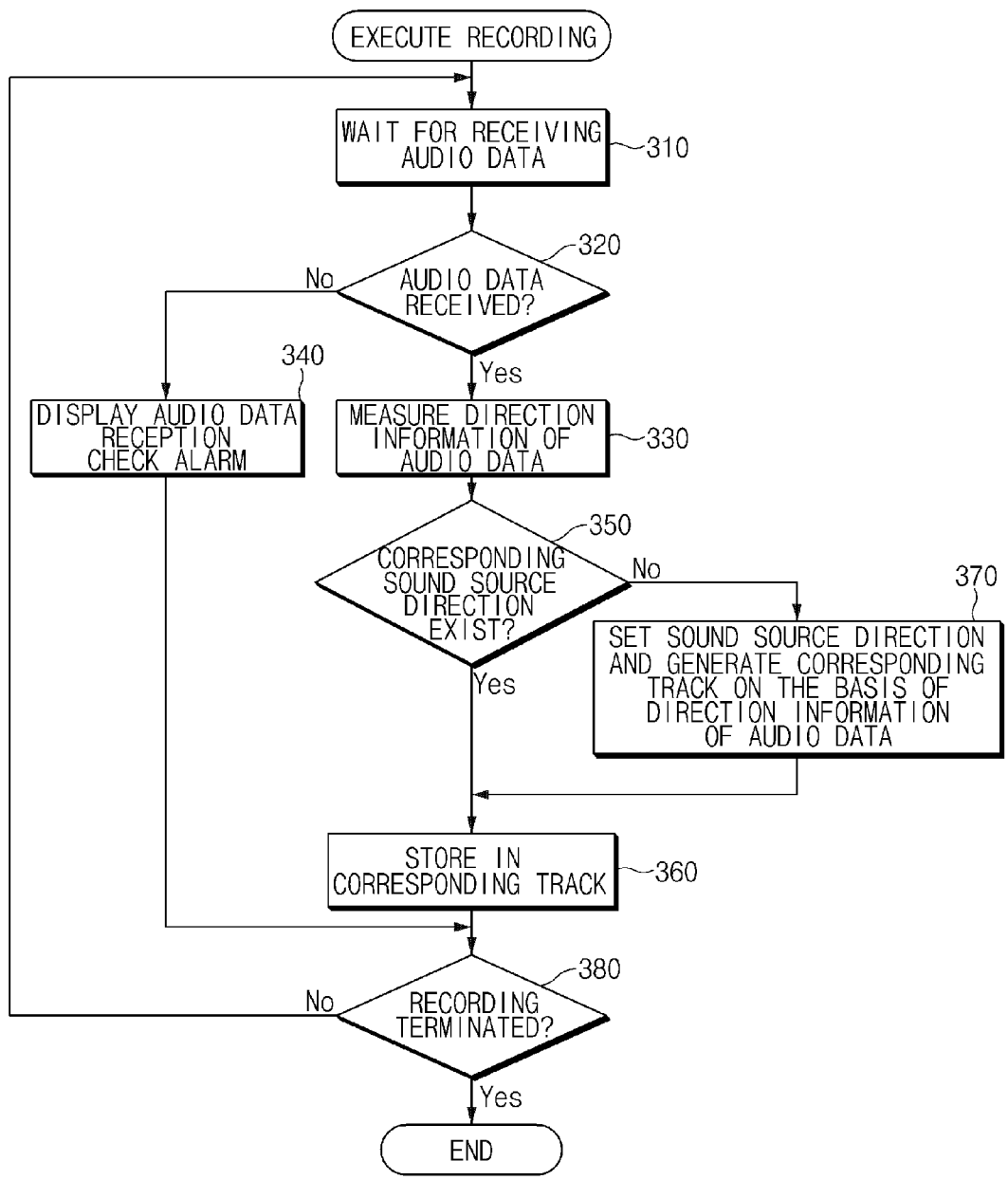
FIG. 3 illustrates an electronic device management method relating to an audio data processing module according to various embodiments of the present disclosure.

FIG. 3 illustrates an electronic device management method relating to an audio data processing module according to various embodiments of the present disclosure.

Referring to FRI. 3, in relation to an electronic device management method, when the recording function of audio data is executed, the audio data processing module 180 may wait for receiving audio data through the input/output interface 150 in operation 310.

In operation 320, the audio data processing module 180 may check whether audio data is received. If the audio data is not received, the audio data processing module 180 may perform processing to display an audio data reception check alarm in operation 340. The audio data reception check alarm may be an object such as a pop-up displaying that there is no received audio data.

If the audio data is received, the audio data processing module 180 may measure a direction value of the received audio data in operation 330. According to various embodiments of the present disclosure, the audio data processing module 180 may measure a direction value by using an intensity difference or a reception time difference of the received audio data.

In operation 350, the audio data processing module 180 may check whether there is a sound source direction range corresponding to the measure direction value. If there is no sound source direction range corresponding to the measure direction value, the audio data processing module 180 may set a new sound source direction range on the basis of the measured direction value in operation 370. Additionally, the audio data processing module 180 may generate a track for storing audio data of a corresponding sound source direction.

According to various embodiments of the present disclosure, the generated track may include a text used for inferring a corresponding sound source direction range as a track name. For example, when the boundary direction values of a corresponding sound source range are the 1 o'clock direction and the 3 o'clock direction, the track may include a text "0103" as a track name. According to various embodiments of the present disclosure, the generated track may include a text used for inferring a reception time of audio data as a track name. For example, the reception time of audio data may be 9:27 on Aug. 19, 2014. In this case, the track may include a text "201408190927" as a track name. According to various embodiments of the present disclosure, the generated track may include a text used for inferring a corresponding sound source direction range and reception time of audio data as a track name. For example, the track may include a text "0103-201408190927" as a track name.

In operation 360, the audio data processing module 180 may store received audio data in the track. According to various embodiments of the present disclosure, the audio data processing module 180 may store entire received audio data or only a sound section in a track.

In operation 380, the audio data processing module 180 may check whether a recording function of audio data is terminated. When the recording function of the audio data is not terminated, the audio data processing module 180 may wait for receiving audio data in operation 310.

Figure 4:
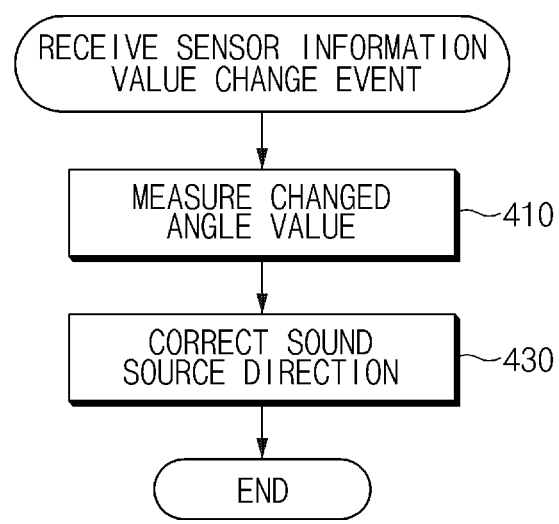
FIG. 4 illustrates an electronic device management method relating to a sound source direction range setting when the position of an electronic device is changed according to various embodiments of the present disclosure.

FIG. 4 illustrates an electronic device management method relating to a sound source direction range setting when the position of an electronic device is changed according to various embodiments of the present disclosure.

Referring to FIG. 1, in relation to an electronic device management method, when receiving a sensor information value change event, the audio data processing module 180 may measure a change angle value on the basis of information collected through an acceleration sensor, a gyro sensor, a geomagnetic sensor, or an earth magnetic sensor in operation 410. According to various embodiments of the present disclosure, the audio data processing module 180 may measure a changed angle value by using object movement and tilt data of an acceleration sensor or object rotation data of a gyro sensor.

In operation 430, the audio data processing module 180 may perform a sound source direction correction task by using a measured change angle value. According to various embodiments of the present disclosure, the audio data processing module 180 may perform a task for correcting a boundary direction value of a predetermined sound source direction range by using a measured change angle value.

Figure 5:
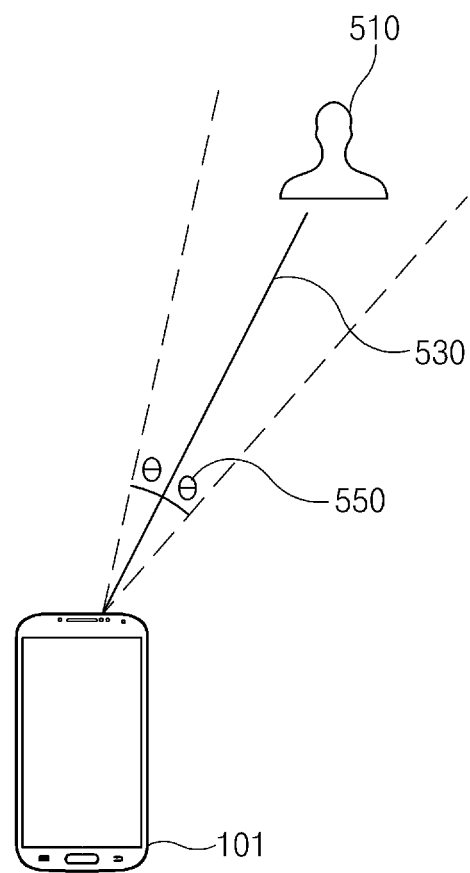
FIG. 5 illustrates a screen for a sound source direction range setting according to various embodiments of the present disclosure.

FIG. 5 illustrates a screen for a sound source direction range setting according to various embodiments of the present disclosure.

Referring to FIG. 5, in relation to a function for recording audio data, the audio data processing module 180 may perform a function for dividing and separating audio data by each direction of audio data and playing them. In this case, the direction values of audio data received from one sound source may be the same. However, even if audio data is substantially received from one sound source, there are some direction value differences. In order to resolve such an issue, the audio data processing module 180 may set a sound source direction range including an error range 550 on the basis of a direction value 530 of audio data received from one sound source 510. The sound source direction range may include an audio data reception allowance range direction value for processing audio data within an error range angle (−θ to θ) as one sound source direction data.

FIG. 6 illustrates an audio data recording screen according to various embodiments of the present disclosure.

Figures 6A, 6B, 6C:
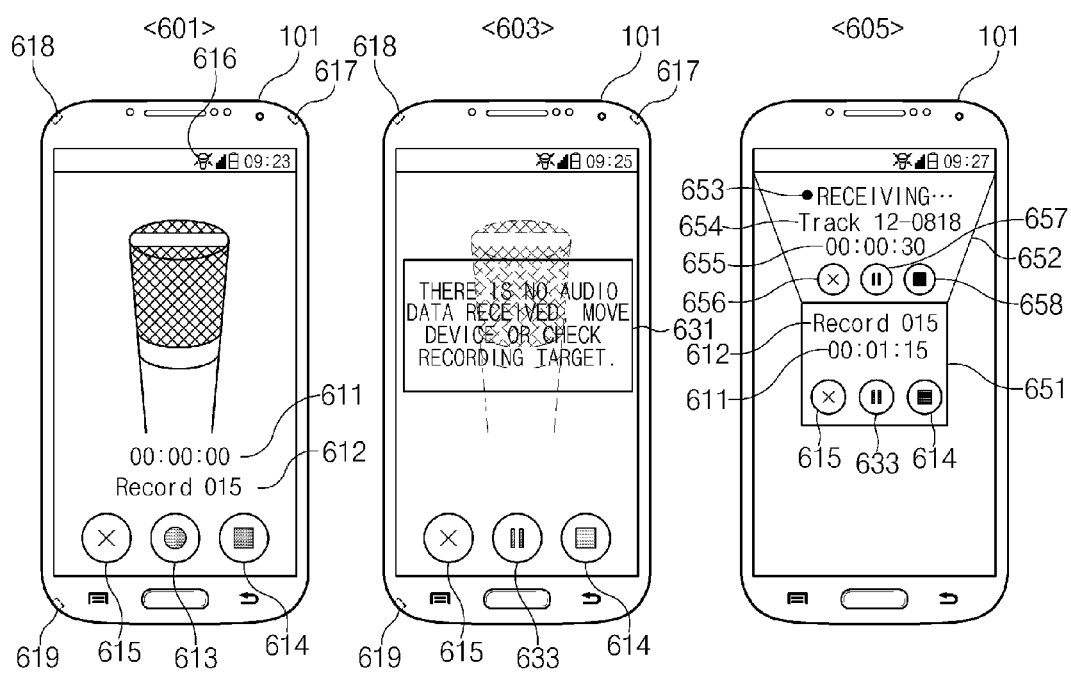
FIGS. 6A, 6B, and 6C (together referred to as FIG. 6) illustrate an audio data recording screen according to various embodiments of the present disclosure.

Referring to FIG. 6A, when an audio data recording application provided from the application 147 is executed, as shown in a state 601, the display 160 may display an audio data recording preparation screen. The audio data recording preparation screen may include a recording time display object 611, a track name display object 612, a recording start button 613, a recording termination button 614, a recording cancel button 615, or a multi-track function icon 616. The multi-track function, as a function of the present disclosure, includes a function for dividing and separating a track by each sound source direction range, and storing and playing them. The multi-track function icon 616 may generate an input signal relating to On/Off of a multi-track function in correspondence to a user's manipulation. Additionally, the multi-track function icon 616 may display a current multi track function execution state (for example, turn-on or turn-off).

Referring to FIG. 6B, in correspondence to the selection of the recording start button 613, the audio data processing module 180 may activate a plurality of microphones. For example, the plurality of microphones (for example, a first microphone 617, a second microphone 618, and a third microphone 619) may be disposed at a housing of the electronic device 101, being spaced a predetermined distance from each other. For example, the first microphone 617 may be disposed at the top right portion of the housing, the second microphone 618 may be disposed at the top left portion of the housing, and the third microphone 619 may be disposed at the bottom left portion. Additionally, the display 160 may display a time counting of the recording time display object 611. In this case, the display 160 may replace the recording start button 613 with the recording pause button 633 and display it.

Referring to FIG. 6C, in correspondence to the selection of the recording termination button 614, the audio data processing module 180 may perform processing to store received audio data. Additionally, the audio data processing module 180 may deactivate a plurality of microphones and may terminate recording time counting. Additionally, the audio data processing module 180 may deliver a recording termination event to at least one of the application 147 and the processor 120. In correspondence to the selection of the recording cancel button 615, the audio data processing module 180 may deactivate a plurality of microphones and terminate recording time counting. Additionally, the audio data processing module 180 may deliver a recording cancel event to at least one of the application 147 and the processor 120.

If there is no audio data collected by the plurality of microphones, as shown in a state 603, the display 160 may display an audio data reception check alarm 631. The audio data reception check alarm 631 may be an object such as a pop-up including a text or image representing that there is no received audio data.

If there is audio data collected by the plurality of microphones, as shown in a state 605, the display 160 may display track information. For example, the display 160 may display integrated track information 651 and track information 652 of a specific sound source direction range. The display 160 may display the integrated track information 651 on the center of a screen. The integrated track information 651 may be an object such as a text box including a sub object containing information on an integrated track. The integrated track information 651 may include a recording time display object 611, an integrated track name display object 612, a recording pause button 633, a recording termination button 614, or a recording cancel button 615.

The track information 652 may be an object of a predetermined area including a sub object containing information on a track. The track information 652 may include a state image during reception 653, a track name display object 654, a track recording time display object 655, a track recording cancel button 656, a track recording pause button 657, or a track recording termination button 658. The display 160 may display the track information 652 in a predetermined area of a screen. For example, the display 160 may divide and display an area by the boundary direction value of a set sound source direction range.

Objects included in the track information 652 may perform a function relating to audio data of a specific sound source direction. For example, in correspondence to the selection of the track recording pause button 657, the audio data processing module 180 may not store received audio data in a corresponding track. In this case, the audio data processing module 180 may continuously received audio data in an integrated track. Additionally, for example, in correspondence to the selection of the track recording termination button 658, the audio data processing module 180 may perform processing to store all or only a sound section of audio data divided by each direction.

FIG. 7 illustrates a sound source direction range specific recording screen according to various embodiments of the present disclosure.

Figures 7A, 7B, 7C:
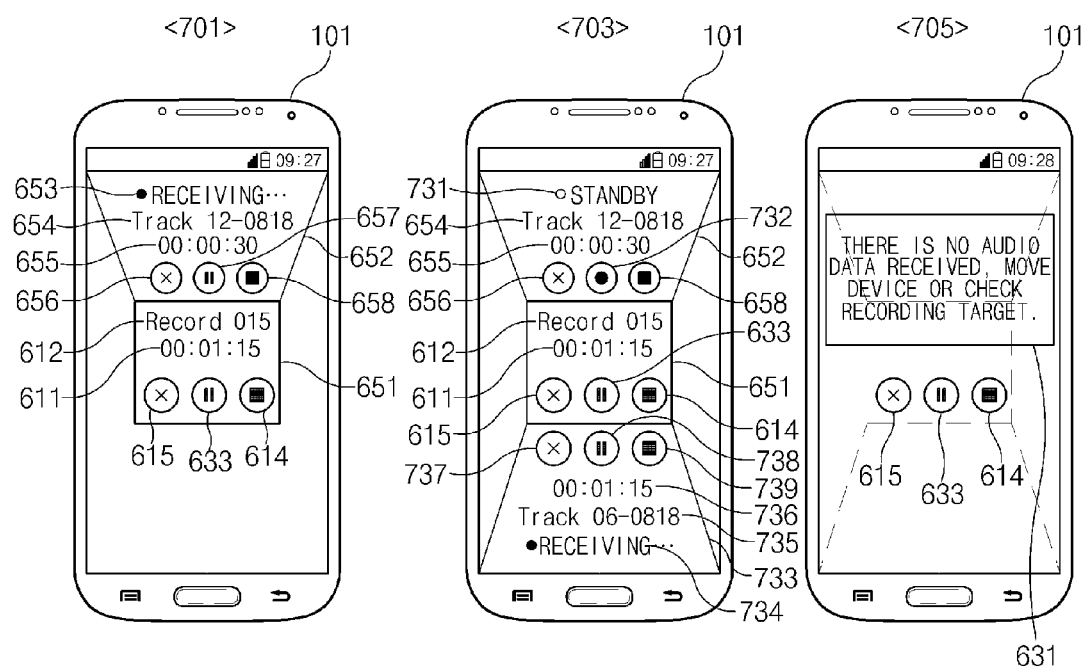
FIGS. 7A, 7B, and 7C (together referred to as FIG. 7) illustrate a sound source direction range specific recording screen according to various embodiments of the present disclosure.

Referring to FIG. 7A, as shown in a state 701, the display 160 according to various embodiments of the present disclosure may display integrated track information 651 and track information 652 of a specific sound source direction range. When the reception of audio data corresponding to the track information 652 stops and audio data of a new sound source direction is received, as shown in a state 703 of FIG. 7B, the display 160 may further display track information 733 of the new sound source direction range. The display 160 may replace the state image 653 during reception included in the track information 652 of a previous sound source range with a state image 731 on standby and display it, and also may replace the track recording pause button 657 with a track recording start button 732. Alternatively, the display 160 may display objects included in the track information 652, which are processed to be faded out or have different transparencies through the audio data processing module 180.

The track information 733 of the new sound source direction range may include a state image during reception 734, a track name display object 735, a track recording time display object 736, a track recording cancel button 737, a track recording pause button 738, or a track recording termination button 739. Objects included in the track information 733 may perform a function relating to audio data of a new sound source direction.

Referring to FIG. 7C, if there is no audio data received while a multi-track function is used, as shown in a state 705, the display 160 may display an audio data reception check alarm 631. In this case, the display 160 may display an object relating to an audio data recording function use. For example, the display 160 may display a recording pause button 633, a recording termination button 614, or a recording cancel button 615.

According to various embodiments of the present disclosure, when audio data corresponding to the track information 652 is received continuously and audio data of a new sound source direction is received additionally, the audio data processing module 180 may simultaneously process audio data of a previous sound source direction and audio data of a new sound source direction. In this case, the display 160 may display track information 652 of a previous sound source direction range and track information 733 of a new sound source direction range.

Figure 8:
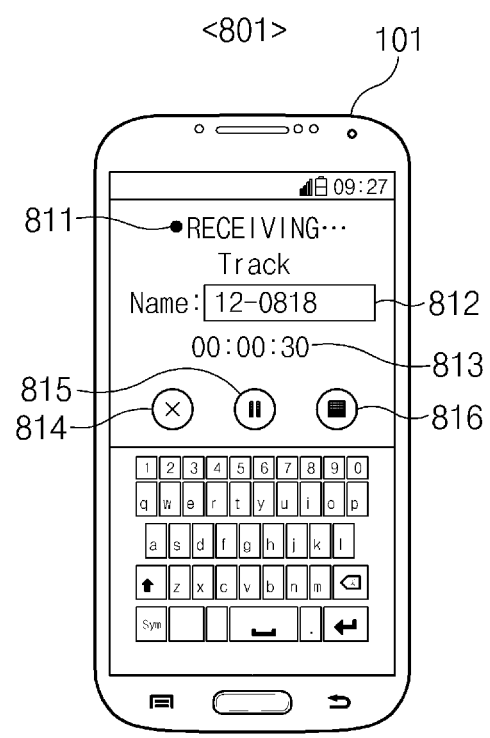
FIG. 8 illustrates a track name setting screen according to various embodiments of the present disclosure.

FIG. 8 illustrates a track name setting screen according to various embodiments of the present disclosure.

Referring to FIG. 8, when a user selects a predetermined area (for example, an area excluding the track recording pause button 657, the track recording termination button 658, and the track recording cancel button 656) of the track information 652 as shown in the state 701, the display 160 according to various embodiments of the present disclosure may display the selected track information in full screen as shown in a state 801. In this case, the audio data processing module 180 may set an index, for example, the name of a selected track, by a user's manipulation.

The track information may include a state image during reception 811, a track name display object 812, a track recording time display object 813, a track recording cancel button 814, a track recording pause button 815, or a track recording termination button 816. According to various embodiments of the present disclosure, in correspondence to the selection of the track name display object 812, the audio data processing module 180 may receive a track name setting event. In this case, the audio data processing module 180 may position a cursor in the track name display object 812 and may perform processing to display a text input tool (for example, a keypad) in a predetermined area of a screen. According to various embodiments of the present disclosure, the audio data processing module 180 may set the name (for example, the file name) of a corresponding track in correspondence to the selection of a track name save button (not shown).

FIG. 9 illustrates a sound source direction range change screen during a position change of an electronic device according to various embodiments of the present disclosure.

Figure 9A:
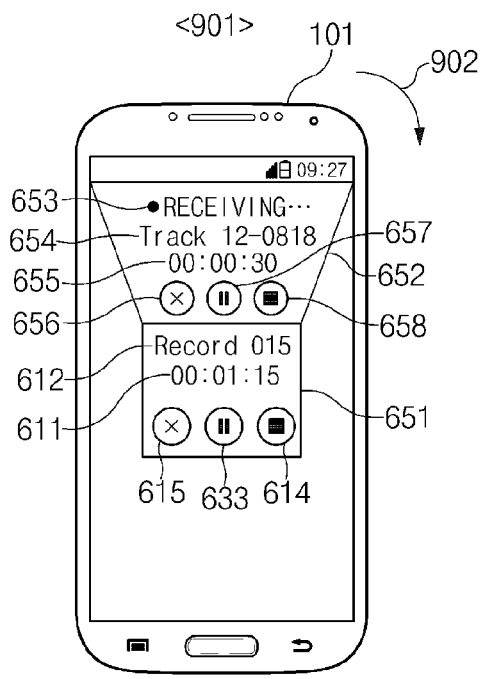
FIGS. 9A and 9B (together referred to as FIG. 9) illustrate a sound source direction range change screen during a position change of an electronic device according to various embodiments of the present disclosure.

Referring to FIG. 9A, as shown in a state 901, the display 160 according to various embodiments of the present disclosure may display integrated track information 651 and track information 652 of a specific sound source direction range. In correspondence to an operation (for example, an operation 902), such as a movement or a rotation of the electronic device 101, the audio data processing module 180 may receive a sensor information value change event.

The audio data processing module 180 may perform a sound source direction correction task in corresponding to a sensor information value change event reception. For example, the boundary direction value of a sound source direction range corresponding to the track information 652 may be the 11 o'clock direction and the 1 o'clock direction. The audio data processing module 180 may measure an angle value, for example, 30° F. (or the 1 o'clock direction), which is changed in correspondence to the operation 902. In this case, the audio data processing module 180 may correct the boundary direction value of a sound source direction range corresponding to the track information 652 to the 10 o'clock direction and the 12 o'clock direction.

Figure 9B:
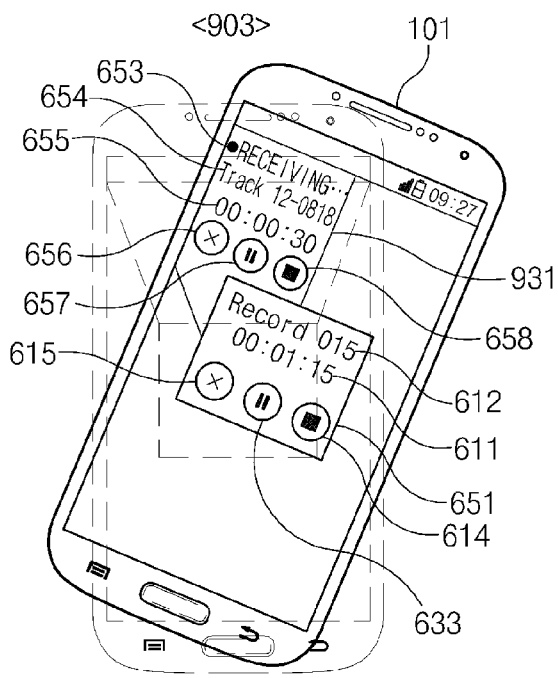

As shown in FIG. 9B, the electronic device 101 is in a state 903, the display 160 may display a corrected boundary direction value with a line, an image, or a text. For example, when the boundary direction values are the 10 o'clock direction and the 12 o'clock direction, the display 160 may display a line indicating the 10 o'clock direction and the 12 o'clock direction on the basis of the center of the front display. Additionally, the display 160 may display track information 931 of the corrected sound source direction range. The track information 931 may include a state image during reception 653, a track name display object 654, a track recording time display object 655, a track recording cancel button 656, a track recording pause button 657, or a track recording termination button 658.

FIG. 10 illustrates an audio data play screen according to various embodiments of the present disclosure.

Figure 10A:
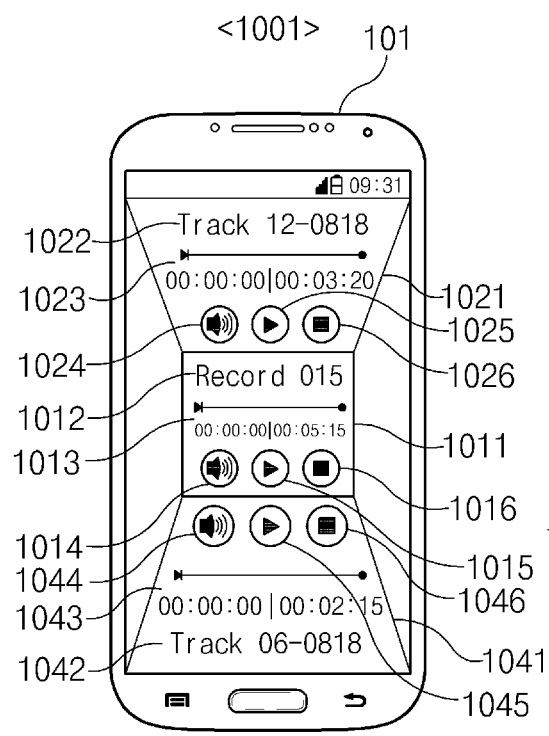
FIGS. 10A and 10B illustrate an audio data play screen according to various embodiments of the present disclosure.

Referring to FIG. 10A, according to various embodiments of the present disclosure, the display 160 may display an audio data play screen. In correspondence to a track selection, the audio data processing module 180 may check whether a selected track is an integrated track on the basis of track information in the header of a track. For example, the audio data processing module 180 may determine whether the selected track is the integrated track by checking whether track item information is included in the header of the selected track.

When the selected track is the integrated track, the audio data processing module 180 may check a related track by using track item information included in the integrated track. Additionally, when the selected track is not the integrated track, the audio data processing module 180 may check the integrated track by using the name of the integrated track, which is additionally or alternatively stored in the header of a track.

As shown in FIG. 10A, wherein the electronic device 101 is in a state 1001, the display 160 may display integrated track information 1011, first track information 1021, and second track information 1041. For example, the display 160 may display the integrated track information 1011 on the center of a screen. The integrated track information 1011 may be an object such as a text box including a sub object containing information on an integrated track. The integrated track information 1011 may include an integrated track name display object 1012, an integrated track play time display object 1013, an integrated track audio volume level setting button 1014, an integrated track play start button 1015, or an integrated track play termination button 1016.

Each of the first track information 1021 and the second track information 1041 may be an object of a predetermined area including a sub object containing information on a track. The first track information 1021 may include a track name display object 1022, a track play time display object 1023, a track audio volume level setting button 1024, a track play start button 1025, or a track play termination button 1026. The second track information 1041 may include a track name display object 1042, a track play time display object 1043, a track audio volume level setting button 1044, a track play start button 1045, or a track play termination button 1046. The display 160 may display the first track information 1021 and the second track information 1041 in different areas of the screen. For example, the display 160 may divide and display an area by the boundary direction value of a sound source direction range included in the header of each track.

In correspondence to the selection of the integrated track play start button 1015, the audio data processing module 180 may perform processing to output audio data of tracks stored in an integrated track. Additionally, the display 160 may replace the integrated track play start button 1015 with an integrated track play pause button (not shown) and display it. In correspondence to the selection of the track play start button 1025, the audio data processing module 180 may perform processing to output audio data of a specific sound source direction stored in a track. Additionally, the display 160 may replace the track play start button 1025 with a track play pause button (not shown). The integrated track play time display object 1013 or the track play time display object 1023 may include time information of recorded audio data. The time information may include a consumed recording time range and may include a display time of the electronic device 100 at the recording time.

Figure 10B:
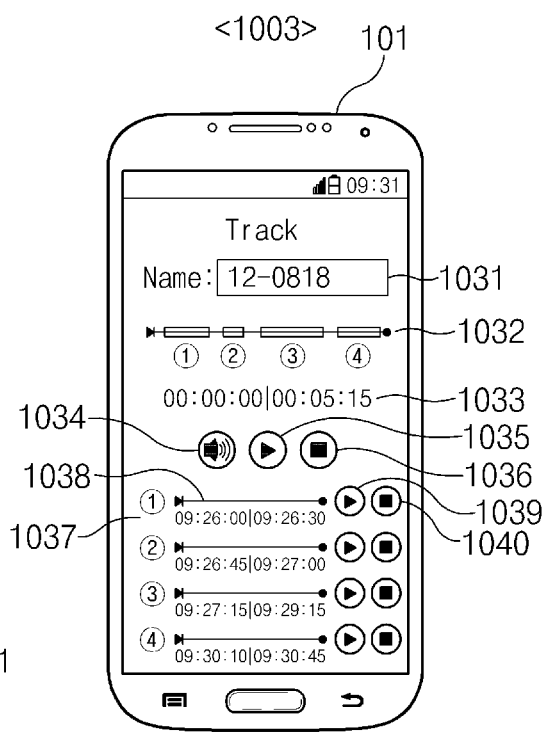

Referring to FIG. 10B, when a user selects a predetermined area (for example, an area excluding the track audio volume level setting button 1024, the track play start button 1025, and the track play termination button 1026) of the first track information 1021, as shown in a state 1003, the display 160 may display the selected track information in full screen. In this case, the audio data processing module 180 may extract sound section information by using the track information included in the header of the selected track. The sound section information may include the number of sound sections stored in a track, and the occurrence time and duration time of each sound section. The audio data processing module 180 may perform processing to display the extracted sound section information.

The track information may include a track name display object 1031, a sound section display object 1032, a track play time display object 1033, a track audio volume level setting button 1034, a track play start button 1035, or a track play termination button 1036. Alternatively, the track information may further include sound section information 1037. The sound section information 1037 may include a sound section play time display object 1038, a sound section play start button 1039, or a sound section play termination button 1040. The sound section display object 1032 may include an object displaying a sound section of audio data. The object displaying a sound section may be an image including information on a sound section of audio data and displaying a text or section displaying a time. In correspondence to the selection of the sound section display object 1032, the display 160 may display the sound section information 1037 in a predetermined area of a screen.

In correspondence to the selection of the track play start button 1035, the audio data processing module 180 may perform processing to output audio data of a specific sound source direction stored in a track. Additionally, the display 160 may replace the track play start button 1035 with a track play pause button (not shown) and display it. In correspondence to the selection of the sound section play start button 1039, the audio data processing module 180 may perform processing to output the selected sound section. Additionally, the display 160 may replace the sound section play start button 1039 with a sound section play pause button (not shown) and display it.

The track play time display object 1033 or the sound section play time display object 1038 may include time information of recorded audio data. The time information may include a consumed recording time range and may include a display time of the electronic device 100 at the recording time.

Figure 11:
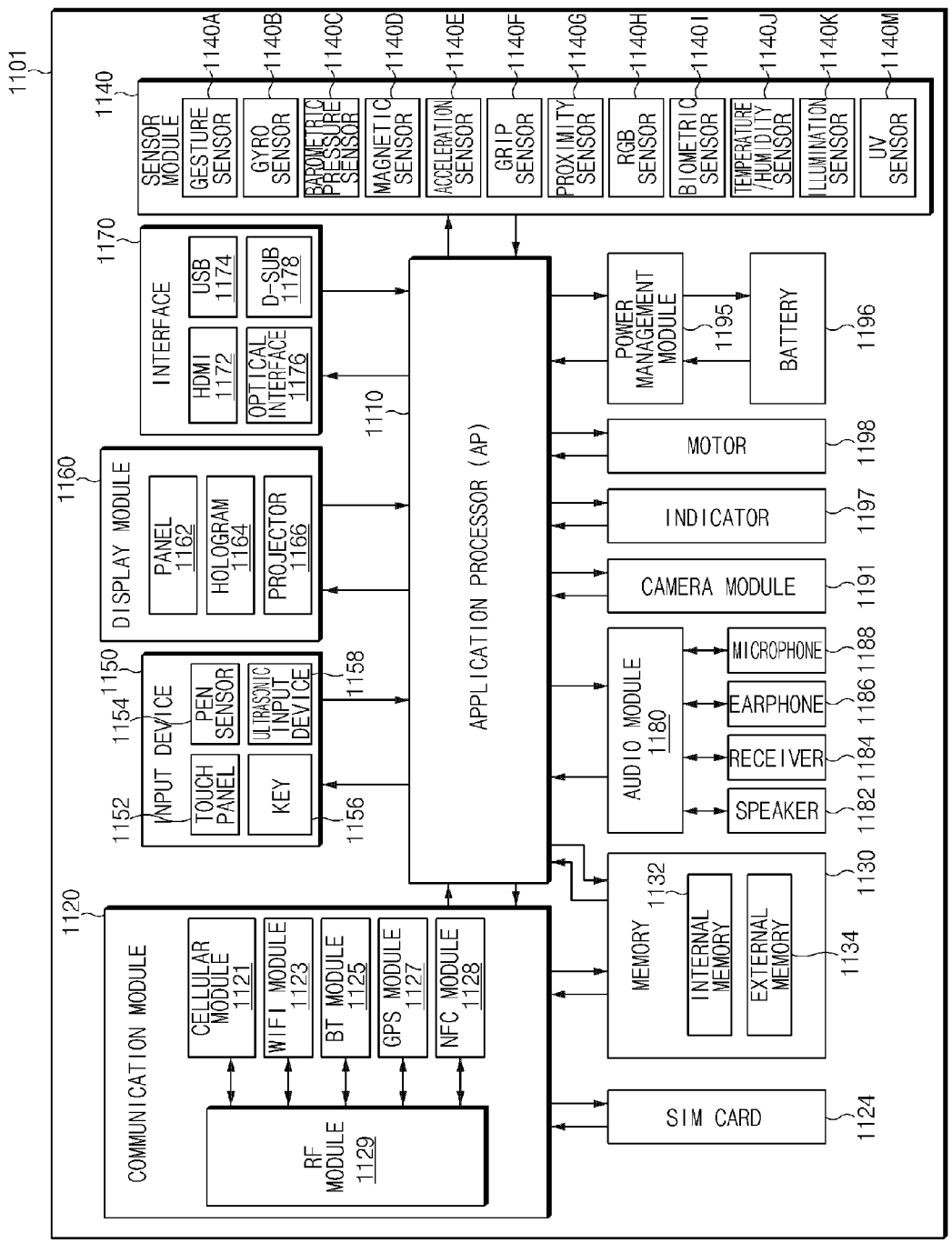
FIG. 11 is a block diagram of an electronic device according to various embodiments of the present disclosure.

FIG. 11 is a block diagram of an electronic device 1101 according to various embodiments of the present disclosure.

Referring to FIG. 11, an electronic device 1101, for example, may configure all or part of the above-mentioned electronic device 101 shown in FIG. 1. The electronic device 1101 may include application processor (AP) 1110, a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may control a plurality of hardware or software components connected to the AP 1110 and also may perform various data processing and operations by executing an operating system or an application program. The AP 1110 may be implemented with a system on chip (SoC), for example. According to an embodiment of the present disclosure, the AP 1110 may further include a graphic processing unit (GPU) (not shown) and/or an image signal processor. The AP 1110 may include at least part (for example, the cellular module 1121) of components shown in FIG. 11. The AP 1110 may load commands or data received from at least one of other components (for example, nonvolatile memory) and process them and may store various data in a nonvolatile memory.

The communication module 1120 may have the same or similar configuration to the communication interface 170 of FIG. 1. The communication module 1120 may include a cellular module 1121, a WiFi module 1123, a BT module 1125, a GPS module 1127, an NFC module 1128, and a radio frequency (RE) module 1129.

The cellular module 1121, for example, may provide voice call, video call, text service, or internet service through communication network. According to an embodiment of the present disclosure, the cellular module 1121 may perform an identification and authentication operation on an electronic device 1101 in a communication network by using a subscriber identification module (for example, the SIM card 1124). According to an embodiment of the present disclosure, the cellular module 1121 may perform at least part of a function that the AP 1110 provides. According to an embodiment of the present disclosure, the cellular module 1121 may further include a communication processor (CP).

Each of the WiFi module 1123, the BT module 1125, the GPS module 1127, and the NFC module 1128 may include a processor for processing data transmitted/received through a corresponding module. According to embodiments of the present disclosure, at least part (for example, at least one) of the WiFi module 1121, the BT module 1123, the GPS module 1125, and the NFC module 1127 may be included in one integrated chip (IC) or in an IC package.

The RF module 1129, for example, may transmit/receive communication signals (for example, RE signals). The RE module 1129, for example, may include a transceiver, a power amp module (PAM), a frequency filter, a low noise amplifier (LNA), or an antenna. According to another embodiment of the present disclosure, at least one of the cellular module 1121, the WiFi module 1123, the BT module 1125, the GPS module 1127, and the NFC module 1128 may transmit/receive RE signals through a separate RE module.

The SIM card 1124 may include a card including a SIM and/or an embedded SIM and also may include unique identification information (for example, an integrated circuit card identifier (ICCID)) or subscriber information (for example, an international mobile subscriber identity (IMSI)).

The memory 1130 (for example, the memory 130) may include an internal memory 1132 or an external memory 1134. The internal memory 1132 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The external memory 1134 may further include flash drive, for example, compact flash (CF), secure digital (SD), micro Micro-SD, Mini-SD, extreme digital (xD), or a memory stick. The external memory 1134 may be functionally and/or physically connected to the electronic device 1101 through various interfaces.

The sensor module 1140 measures physical quantities or detects an operating state of the electronic device 1101, thereby converting the measured or detected information into electrical signals. The sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (for example, a red, green, blue (RGB) sensor), a biometric sensor 1140I, a temperature/humidity sensor 1140I, an illumination sensor 1140K, and an ultra violet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1140 may further include a control circuit for controlling at least one sensor therein. According to an embodiment of the present disclosure, the electronic device 1101 may further include a processor configured to control the sensor module 1140 as part of or separately from the AP 1110 and thus may control the sensor module 1140 while the AP 1110 is in a sleep state.

The input device 1150 may include a touch panel 1152, a (digital) pen sensor 1154, a key 1156, or an ultrasonic input device 1158. The touch panel 1152 may use at least one of capacitive, resistive, infrared, or ultrasonic methods, for example. Additionally, the touch panel 1152 may further include a control circuit. The touch panel 1152 may further include a tactile layer to provide tactile response to a user.

The (digital) pen sensor 1154, for example, may include a sheet for recognition as part of a touch panel or a separate sheet for recognition. The key 1156 may include a physical button, an optical key, or a keypad, for example. The ultrasonic input device 1158 may check data by detecting sound waves through a microphone (for example, a microphone 1188) in the electronic device 1101 through an input tool generating ultrasonic signals.

The display 1160 (for example, the display 160) may include a panel 1162, a hologram device 1164, or a projector 1166. The panel 1162 may have the same or similar configuration to the display 160 of FIG. 1. The panel 1162 may be implemented to be flexible, transparent, or wearable, for example. The panel 1162 and the touch panel 1152, may be configured with one module. The hologram 1164 may show three-dimensional images in the air by using the interference of light. The projector 1166 may display an image by projecting light on a screen. The screen, for example, may be placed inside or outside the electronic device 1101. According to an embodiment of the present disclosure, the display 1160 may further include a control circuit for controlling the panel 1162, the hologram device 1164, or the projector 1166.

The interface 1170 may include a high-definition multi-media interface (HDMI) 1172, a universal serial bus (USB) 1174, an optical interface 1176, or a D-subminiature (sub) 1178, for example. The interface 1170, for example, may be included in the communication interface 170 shown in FIG. 1. Additionally or alternately, the interface 1170 may include a mobile high-definition link (MHL) interface, a secure Digital (SD) card or multi-media card (MMC) interface, or an infrared data association (IrDA) standard interface.

The audio module 1180 may convert sound into electrical signals and convert electrical signals into sounds. At least some components of the audio module 1180, for example, may be included in the input/output interface 150 shown in FIG. 1. The audio module 1180 may process sound information inputted/outputted through a speaker 1182, a receiver 1184, an earphone 1186, or a microphone 1188.

The camera module 1191, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1195 may manage the power of the electronic device 1101. Although not shown in the drawings, the power management module 1195 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the batter 1196, or a voltage, current, or temperature thereof during charging. The battery 1196, for example, may include a rechargeable battery and/or a solar battery.

The indicator 1197 may display a specific state of the electronic device 1101 or part thereof (for example, the AP 1110), for example, a booting state, a message state, or a charging state. The motor 1198 may convert electrical signals into mechanical vibration and may generate vibration or haptic effect. Although not shown in the drawings, the electronic device 1101 may include a processing device (for example, a GPU) for mobile TV support. A processing device for mobile TV support may process media data according to the standards such as digital multimedia broadcasting (DMB), digital video broadcasting (DVB), or media-FLO.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of the components in an electronic device according to various embodiments of the present disclosure are configured as one entity, such that functions of previous corresponding components are performed identically.

Figure 12:
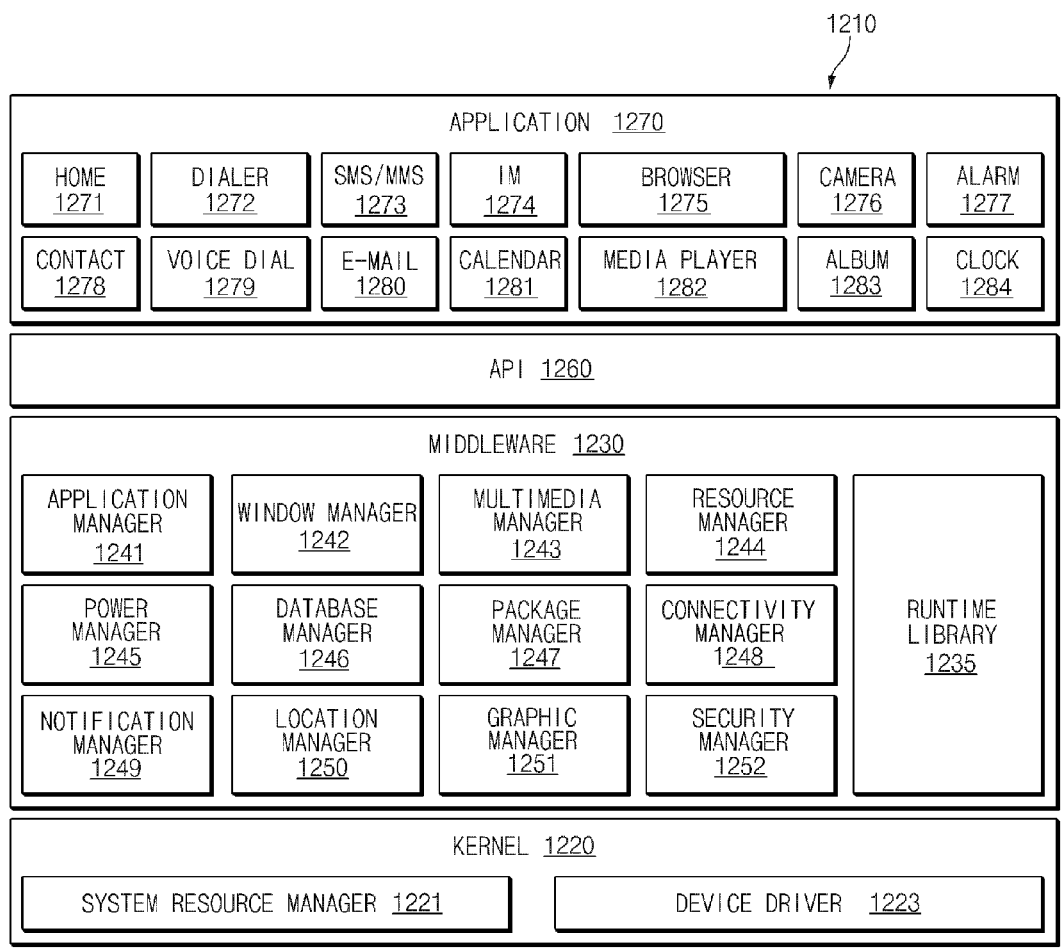
FIG. 12 illustrates a program module according to various embodiments of the present disclosure.

FIG. 12 is a block diagram of a program module 1210 according to various embodiments of the present disclosure.

According to an embodiment, the program module 1210 (for example, the program 140) may include an operating system (OS) for controlling a resource relating to an electronic device (for example, the electronic device 101) and/or various applications (for example, the application program 147) running on the OS. The OS, for example, may include android, iOS, windows, symbian, tizen, or bada.

The program module 1210 may include a kernel 1220, a middleware 1230, an API 1260, and/or an application 1270. At least part of the program module 1210 may be preloaded on an electronic device or may be downloaded from a server (for example, the server 106).

The kernel 1220 (for example, the kernel 141 of FIG. 1), for example, may include a system resource manager 1221, or a device driver 1223. The system resource manager 1221 may perform the control, allocation, or retrieval of a system resource. According to an embodiment of the disclosure, the system resource manager 1221 may include a process management unit, a memory management unit, or a file system management unit. The device driver 1223, for example, a display driver, a camera driver, a Bluetooth driver, a sharing memory driver, a USB driver, a keypad driver, a WiFi driver, an audio driver, or an inter-process communication (IPC) driver.

The middleware 1230, for example, may provide a function that the application 1270 requires commonly, or may provide various functions to the application 1270 through the API 1260 in order to allow the application 1270 to efficiently use a limited system resource inside the electronic device. According to an embodiment of the disclosure, the middleware 1230 (for example, the middleware 143) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235, for example, may include a library module that a complier uses to add a new function through a programming language while the application 1270 is running. The runtime library 1235 may perform a function on input/output management, memory management, or an arithmetic function.

The application manager 1241, for example, may mange the life cycle of at least one application among the applications 1270. The window manager 1242 may manage a GUI resource used in a screen. The multimedia manager 1243 may recognize a format for playing various media files and may encode or decode a media file by using the coder corresponding to a corresponding format. The resource manager 1244 may manage a resource such as a source code, a memory, or a storage space of at least any one of the applications 1270.

The power manager 1245, for example, may operate together with a basic input/output system (BIOS) to manage the battery or power and may provide power information necessary for an operation of the electronic device. The database manager 1246 may create, search, or modify a database used in at least one application among the applications 1270. The package manager 1247 may manage the installation or update of an application distributed in a package file format.

The connectivity manger 1248 may manage a wireless connection such as WiFi or Bluetooth. The notification manager 1249 may display or notify an event such as arrival messages, appointments, and proximity alerts. The location manager 1250 may manage location information on an electronic device. The graphic manager 1251 may manage a graphic effect to be provided to a user or a user interface relating thereto. The security manager 1252 may provide various security functions necessary for system security or user authentication. According to an embodiment, when an electronic device (for example, the electronic device 101) includes a phone function, the middleware 1230 may further include a telephony manager for managing a voice or video call function of the electronic device.

The middleware 1230 may include a middleware module for forming a combination of various functions of the above-mentioned components. The middleware 1230 may provide a module specialized for each type of OS to provide differentiated functions. Additionally, the middleware 1230 may delete part of existing components or add new components dynamically.

The API 1260 (for example, the API 145), for example, as a set of API programming functions, may be provided as another configuration according to OS. For example, in the case of android or iOS, one API set may be provided for each platform and in the case Tizen, at least two API sets may be provided for each platform.

The application 1270 (for example, the application program 147), for example, may include at least one application for providing functions such as a home 1271, a dialer 1272, an SMS/MMS 1273, an instant message 1274, a browser 1275, a camera 1276, an alarm 1277, a contact 1278, a voice dial 1279, an e-mail 1280, a calendar 1281, a media player 1282, an album 1283, a clock 1284, health care (for example, measure an exercise amount or blood sugar), or environmental information provision (for example, provide air pressure, humidity, or temperature information).

According to an embodiment, the application 1270 may include an application (hereinafter referred to as "information exchange application") for supporting information exchange between the electronic device (for example, the electronic device 101) and an external electronic device (for example, the electronic device 102 or 104). The information exchange application, for example, may include a notification relay application for relaying specific information to the external device or a device management application for managing the external electronic device.

For example, the notification relay application may have a function for relaying to an external electronic device (for example, the electronic device 102 or 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user. The device management application, for example, may manage (for example, install, delete, or update) at least one function (turn-on/turn off of the external electronic device itself (or some components) or the brightness (or resolution) adjustment of a display) of an external electronic device (for example, the electronic device 104) communicating with the electronic device, an application operating in the external electronic device, or a service (for example, call service or message service) provided from the external device.

According to an embodiment, the application 1270 may include a specified application (for example, a health care application) according to the property (for example, as the property of an electronic device, when the type of the electronic device is a mobile medical device) of the external electronic device (for example, the electronic device 102 or 104). According to an embodiment, the application 1270 may include an application received from an external electronic device (for example, the server 106 or the electronic device 102 or 104). According to an embodiment of the disclosure, the application 1270 may include a preloaded application or a third party application downloadable from a server. The names of components in the program module 1210 according to the shown embodiment may vary depending on the type of OS.

According to various embodiments of the present disclosure, at least part of the program module 1210 may be implemented with software, firmware, hardware, or a combination thereof. At least part of the programming module 1210, for example, may be implemented (for example, executed) by a processor (for example, the AP 1110). At least part of the programming module 1210 may include a module, a program, a routine, sets of instructions, or a process to perform at least one function, for example.

According to various embodiments of the present disclosure, audio data received from a sound source of a specified direction may be selectively played by separately dividing and processing audio data received from a plurality of sound sources disposed in different directions.

Additionally, according to various embodiments of the present disclosure, a storage space may be efficiently used and a processing time of audio data may be shortened by storing and playing only a sound section of audio data.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device.

According to various embodiments of the present disclosure, at least part of a device (for example, modules or functions thereof) or a method (for example, operations) according to this disclosure, for example, a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Although the present disclosure has been described with an embodiment, various changes and modifications may be suggested to one skilled in the art. It is intended that the present disclosure encompass such changes and modifications as fall within the scope of the appended claims.

What is claimed is:

1. An electronic device for processing audio data, the electronic device comprising:
   a plurality of microphones configured to receive audio data from at least one of direction, the audio data including at least one sound section for each of the at least one direction, where the at least one sound section includes sounds of a specified frequency band that exist within a specified time interval; and
   an audio data processing module configured to:
      divide the received audio data by each of the at least one direction, and identify at least one sound section and at least one mute section from the divided audio data of each of the at least one direction based on the specified frequency band that exists within the specified time interval, and a memory configured to store only the at least one sound section of the audio data.

2. The electronic device of claim 1, wherein the audio data processing module is configured to convert the at least one sound section identified from a same direction into one file when an audio data collection is terminated.

3. The electronic device of claim 1, wherein the memory is further configured to store the at least one sound section identified by each of the at least one direction.

4. The electronic device of claim 3, wherein the audio data includes track information, wherein the memory is further configured to store an audio data play request, wherein the audio data processing module is configured to display the track information of the audio data corresponding to the stored audio data play request.

5. The electronic device of claim 4, wherein the audio data processing module is configured to display one or more of the at least one sound section included in the divided audio data.

6. The electronic device of claim 1, wherein the audio data includes track information, wherein the audio data processing module is configured to display the track information of audio data while being received by the plurality of microphones.

7. The electronic device of claim 6, wherein the audio data processing module is configured to display the track information of the audio data while one of the at least one sound section is currently identified, and remove the displayed track information of the audio data when no sound section is currently identified.

8. The electronic device of claim 6, wherein the audio data processing module is configured to calculate a change angle corresponding to a position change of the electronic device and correct track information corresponding to the calculated change angle.

9. The electronic device of claim 8, wherein the audio data processing module is configured to display the track information of the audio data corrected based on the change angle.

10. The electronic device of claim 1, further comprising:
an input device configured to receive an input event, wherein the audio data processing module is configured to display an index on track information corresponding to the input event.

11. An audio data processing method of an electronic device, the method comprising:
receiving audio data from at least one of direction by using a plurality of microphones, the audio data including at least one sound section for each of the at least one direction, where the at least one sound section includes sounds of a specified frequency band that exist within a specified time interval;

dividing, by a processor, the received audio data by each of the at least one direction; and identifying, by the processor, at least one sound section and at least one mute section from the divided audio data of each of the at least one direction based on the specified frequency band that exists within the specified time interval; and storing, by a memory, only the at least one sound section of the audio data.

12. The method of claim 11, further comprising converting the at least one sound section identified from a same direction into one file when an audio data collection is terminated.

13. The method of claim 11, further comprising storing, by the memory, the at least one sound section identified by each of the at least one direction.

14. The method of claim 13, wherein the audio data includes track information, further comprising:
storing, by the memory, an audio data play request, and
displaying the track information of the audio data corresponding to the stored audio data play request.

15. The method of claim 14, wherein the displaying of the track information comprises displaying one or more of the at least one sound section included in the divided audio data.

16. The method of claim 11, wherein the audio data includes track information, further comprising displaying the track information of audio data while being received by the plurality of microphones.

17. The method of claim 16, wherein the displaying of the track information comprises:
displaying the track information of the audio data while one of the at least one sound section is currently identified; and
removing the displayed track information of the audio data when no sound section is currently identified.

18. The method of claim 16, further comprising:
calculating a change angle corresponding to a position change of the electronic device; and
correcting track information corresponding to the calculated change angle.

19. The method of claim 18, further comprising displaying the track information of the audio data corrected based on the change angle.

20. The method of claim 11, further comprising:
receiving, by an input device, an input event; and
displaying an index on track information corresponding to the input event.

* * * * *